United States Patent [19]

Baradel et al.

[11] Patent Number: 4,976,864

[45] Date of Patent: Dec. 11, 1990

[54] TREATMENT OF THE EFFLUENTS FROM THE PRODUCTION OF EPOXY RESINS

[75] Inventors: Agostino Baradel, San Donato Milanese; Gino Della Penna; Silvio Gulinelli, both of Rome; Mario Valdiserri, Monterotondo; Andrea Robertiello, Rome, all of Italy

[73] Assignee: Eniricerche S.p.A., Milan, Italy

[21] Appl. No.: 418,227

[22] Filed: Oct. 6, 1989

[30] Foreign Application Priority Data

Oct. 7, 1988 [IT] Italy ................................ 22221 A/88

[51] Int. Cl.$^5$ ........................... C02F 3/28; C02F 1/469
[52] U.S. Cl. ..................................... 210/610; 210/617; 210/631; 210/766; 210/908
[58] Field of Search ......................... 210/605, 610–612, 210/615–617, 630, 631, 664, 718, 766, 774, 908, 909

[56] References Cited

U.S. PATENT DOCUMENTS

| | | | |
|---|---|---|---|
| 4,053,394 | 10/1977 | Fisk | 210/610 X |
| 4,216,088 | 8/1980 | Juferov et al. | 210/909 X |
| 4,297,216 | 10/1981 | Ishida et al. | 210/631 X |
| 4,382,865 | 5/1983 | Sweeny | 210/909 X |

*Primary Examiner*—Tom Wyse
*Attorney, Agent, or Firm*—Hedman, Gibson, Costigan & Hoare

[57] ABSTRACT

Process for the treatment of aqueous effluents from the production of epoxy resins, which effluents contain as their main impurities chlorohydrins, glycidol, isopropyl alcohol and sodium chloride, which process comprises the following steps:

(a) hydrolytic treatment of the effluent under alkaline conditions, until the effluent's content of epichlorohydrin in reduced down to values of about 75 ppm, and the effluent's glycidol content is reduced to values lower than about 4,000 ppm;

(b) removal of about 90% of sodium chloride from the hydrolyzed effluent; and (c) anaerobic digestion of the hydrolyzed, sodium chloride-deprived effluent, after preliminary dilution, neutralization and integration with nitrogen and phosphorus sources.

The (b) step can be carried out by means of a process of concentration of the effluent, in order to cause sodium chloride to precipitate, or by submitting the same effluent to a treatment of electrodialysis.

7 Claims, No Drawings

TREATMENT OF THE EFFLUENTS FROM THE PRODUCTION OF EPOXY RESINS

The present invention relates to a process for the treatment of the effluents from the production of the epoxy resins.

In the processes of production of epoxy resins from diphenols, in particular from bisphenol-A and epichlorohydrin, waste waters are produced which mainly contain sodium chloride, residual solvents, epichlorohydrin and the products of hydrolysis of this latter. In particular, this effluent is an aqueous solution having a pH value of about 10, with a COD value (the amount of oxygen which is required in order to oxidize the organic substances present in the same solution) of the order of 80–90 g/liter, containing epichlorohydrin, isopropyl alcohol, glycidol, glycerol, 3-chloro-1,2-propane-diol, 1,1-dichlorohydrin, 1,2-dichlorohydrin and sodium chloride.

Owing to its content of chlorinated solvents, and to its high concentration of sodium chloride, the effluent performs a toxic-inhibiting action on both aerobic and anaerobic microbial flora. In particular, such an effluent cannot be disposed off in the aerobic-oxidation facilities normally destined to the treatment of the industrial wastes, and this is a technical problem.

The present Applicant has found now that the waste waters coming from the production of the epoxy resins can be submitted to an anaerobic digestion, with the relevant COD values being decreased down to negligible values as compared to the initial values, after a preliminary treatment for eliminating, or anyway decreasing to a substantial extent the contents of organic chlorine and of sodium chloride. The present Applicant was also able to find that the waste liquors which underwent such an anaerobic digestion, can be directly disposed off by means of the normal facilities used for the aerobic treatment of wastes.

In accordance therewith, the present invention relates to a process for the treatment of aqueous effluents from the production of epoxy resins, which effluents contain as their main impurities chlorohydrins, glycidol, isopropyl alcohol and sodium chloride, which process is characterized in that it comprises the following steps:

(a) hydrolytic treatment of the effluent under alkaline conditions, until the effluent's content of epichlorohydrin in reduced down to values of about 75 ppm, and the effluent's glycidol content is reduced to values lower than about 4,000 ppm;

(b) removal of at least about 90% of sodium chloride from the hydrolysed effluent; and (c) anaerobic digestion of the hydrolysed, sodium chloride-depleted effluent, after preliminary dilution, neutralization and integration with nitrogen and phosphorus sources.

A typical effluent which can be submitted to the process according to the present invention is an aqueous effluent with a pH value of about 10, a COD value of 80–90 g/liter, with densities of 1.18–1.20 g/liter, which contains from 4 to 5 g/liter of epichlorohydrin, from 16 to 22 g/liter of isopropyl alcohol, from 5 to 10 g/liter of glycidol, from 7 to 9 g/liter of 3-chloro-1,2-propanediol, from 0.5 to 1.5 g/liter of 1,1-dichlorohydrin, from 0.1 to 0.5 g/liter of 1,2-dichlorohydrin and from 270 to 290 g/liter of sodium chloride.

According to the process of the present invention, such an effluent is submitted to hydrolysis, in the presence of sodium hydroxide, which is added to the same effluent in an amount comprised within the range of from 5 to 10 g/liter. In particular, the process is carried out at a pH value of the reaction medium comprised within the range of from about 11 up to about 13, at a temperature comprised within the range of from 50° up to 100° C., and preferably comprised within the range of from 80° to 90° C., and for a time comprised within the range of from 1 to 10 hours and preferably of the order of from 5 to 6 hours.

During the treatment of hydrolysis, the isopropyl alcohol can be at least partially removed from the reaction medium, and the same alcohol can be recovered as an aqueous solution. This latter, if desired, can be recycled to the (c) step of the process. By operating within the range of the above stated conditions, the content of epichlorohydrin in the waste liquors is reduced down to values lower than 75 ppm (parts per million by weight) and preferably to values lower than 10 ppm and the contents of glycidol is reduced to values lower than 4,000 ppm, and preferably lower than 3,000 ppm. Furthermore, the contents of 3-chloro-1,2-propane-diol, 1,1-dichlorohydrin and 1,2-dichlorohydrin are reduced down to values of a few ppm.

In the (b) step of the process, the hydrolysed effluent is submitted to a treatment capable of eliminating at least about 90% of sodium chloride. For that purpose, the process can be carried out by concentrating the solution, preferably under a reduced pressure, or by submitting the same solution to a treatment of electrodialysis. This latter treatment is preferably carried out inside a modified cell, which makes it possible sodium to be separated as aqueous sodium hydroxide, and chlorine to be separated as aqueous hydrochloric acid. This cell, which is described in greater detail in the following experimental examples, prevents any development of chlorine gas and reduces the problems of corrosion and the chemical attack of the membranes by the same chlorine.

The so obtained desalted effluent, after the preliminary addition of the aqueous solution of isopropyl alcohol separated in the (a) step and of water separated in the (b) step, is diluted down to a value of COD of the order of from 15 to 20 g/liter, and is submitted to anaerobic digestion in the (c) step of the process according to the present invention. After the dilution, the concentration of epichlorohydrin, of glycidol and of sodium chloride respectively decreases down to values lower than about 5, 1,200 and 20,000 ppm. The operation of digestion can be carried out by using an anaerobic filter suitably inoculated and previously started up with a synthetic substrate, until microbial flora is acclimated. Finally, the diluted waste liquors are submitted to anaerobic digestion, after a preliminary neutralization down to a pH value of about 7, and addition of nitrogen and phosphorus sources.

By means of this treatment, the value of COD of the anaerobicalluy-digested waste waters is decreased by an extent of more than 80%, and the resulting waste liquors can be directly discharged into the normal facilities used for the aerobic digestion of wastes.

The following experimental examples are illustrative of the process according to the present invention.

EXAMPLE 1

(A) To the treatment according to the present invention an effluent is submitted, which is constituted by a byproduct deriving from the production of epoxy resins from bisphenol A and epichlorohydrin, having the following average composition:

| | |
|---|---|
| epichlorohydrin | 4,1 g/liter |
| isopropyl alcohol | 17,0 g/liter |
| glycidol | 9.6 g/liter |
| glycerol | 6.3 g/liter |
| 3-chloro-1,2-propane-diol | 8.0 g/liter |
| 1,1-dichlorohydrin | 1.0 g/liter |
| 1,2-dichlorohydrin | 0.35 g/liter |
| sodium chloride | 280.0 g/liter |

Said effluent additionally has a pH value of 10.0, a COD value of 83.0 g/liter and a density value of 1.19 g/ml.

(B) To this effluent, sodium hydroxide is added up to a concentration of sodium hydroxide of 8.0 g/liter, and the effluent is heated up to 95° C., and is kept at this temperature for 5.5. hours, by operating inside a laboratory-size rotary evaporator. The vapour released during the treatment are collected and condensed at a temperature of 4° C. Five liters of effluent are treated, and about 430 ml of condensate are collected. The condensate contains a concentration of 19.8% of isopropyl alcohol. In this way, about 95% of alcohol is recovered.

(C) The residue obtained from the above treatment is concentrated by operating at about 70° C. and under a pressure of 300 torr, until 3.0 liters of condensate is obtained. The crystals of sodium chloride formed during the concentration are filtered off under vacuum, with about 1.15 kg of dry sodium chloride and 600 ml of mother liquors being obtained.

The solution of isopropyl alcohol collected during the hydrolysis of epichlorohydrin, the condensate obtained during the concentration step and the mother liquors are combined and the volume of the combined liquors is adjusted at 5 liter by means of the addition of water. A solution is thus obtained, which has a practically unchanged COD concentration as compared to the pristine waste waters. This solution is diluted with a dilution ratio of about 1:4, and a waste liquor is obtained, which has the following composition:

| | |
|---|---|
| epichlorohydrin | <5 ppm |
| isopropyl alcohol | 4.1 g/liter |
| glycidol | 0.8 g/liter |
| glycerol | 8.5 g/liter |
| 3-chloro-1,2-propane-diol | 20 ppm |
| 1,1-dichlorohydrin | 20 ppm |
| 1,2-dichlorohydrin | 20 ppm |
| sodium chloride | 12.5 g/liter |

The solution, which additionally has a pH value of 12.0 and a COD value of 19.8 g/liter, is submitted to anaerobic digestion, after the preliminary integration with about 1.1 ml of a solution of concentrated ammonium hydroxide per each liter of waste liquor, and neutralization with about 2.2 ml of a solution of concentrated phosphoric acid per each liter of waste liquor.

(D) The anaerobic digestion is carried out by using an anaerobic filter constituted by a cylindrical reactor of 35 liters of total volume (D=15 cm; H=2 m); packed with river pebbles having an average diameter of about 5 cm (empty room degree of the reactor=0.5), and with the operating temperature being maintained at about 35° C.

The filter is inoculated with 4.5 liters of a suspension containing a mixed, non-specific, anaerobic flora and started up with a synthetic substrate at a pH value of 7.0 and with a COD value of 25.0 g/liter, having the following composition:

| | |
|---|---|
| sodium acetate | 1.2 g/liter |
| $KH_2PO_4$ | 1.2 g/liter |
| NaCl | 4.8 g/liter |
| Glycerol | 4.8 g/liter |
| IPA (isopropyl alcohol) | 7.2 g/liter |
| $H_3PO_4$ | 2.2 ml/liter |
| $NH_4Cl$ | 1.1 ml/liter |

During the start-up step, the anaerobic filter is fed with progressively increasing organic loads until about 4 kg of COD/mc per day is reached. On the 28th day, the process of acclimation of the flora to the synthetic substrate can be regarded as concluded, and the synthetic substrate is replaced by the treated effluent, obtained as disclosed under (C).

The change of substrate involves initially a considerable decrease in the performance of the anaerobic filter, with a decrease in biogas production of about 60%. After about 10 days, the microbial flora is acclimated and on the 46th day a production of biogas is reached, which is similar to the reduction obtained with the synthetic substrate (decrease of COD by an extent of about 80%). During the anaerobic treatment, no appreciable changes are observed in pH, whose values remain within the range of from 6.3 to 7.0.

EXAMPLE 2

320 ml of the effluent having the same composition as reported under (A) in Example 1 is allowed to decant for 48 hours. The supernatant (about 300 ml), having a COD value of 80 g/liter, is submitted to a first filtration through sintered filters of 3 $\mu$m, in order to separate any traces of material in corpuscular form, potentially capable of damaging the membranes of the electrodialyser device. The filtrate, having a nearly unchanged COD value as compared to the starting material, is submitted to the hydrolysis of epichlorohydrin under the same conditions as disclosed under (B), Example 1. The hydrolysed solution is diluted 1:4, is filtered again through a membrane filter (pore diameter 0.2 $\mu$m), and is then electrodialysed.

The process of electrodialysis is carried out inside a cell inside which, between the anion-exchange membranes and the anode, a second cation-exchange membrane is installed. Between this latter and the anode, a fourth compartment is therefore obtained, into which a solution of sulfuric acid is fed. With this arrangement, the chlorine ions passing through the anion-exchange membrane cannot reach the anode, with the formation of free chlorine being thus prevented. At the anode, only the development of oxygen and the migration of hydrogen ions through the cation-exchange membrane take hence place. Inside the third compartment of the cell, the above said hydrogen ions and chlorine ions form hydrochloric acid.

The conditions of electrodialysis are the following:

| | |
|---|---|
| anion-exchange membrane | NEOSEPTA AM3 |
| cation-exchange membrane | NEOSEPTA C6610F |
| surface area of the electrodes | 100 $cm^2$ |
| current density | 800 $A/cm^2$ |
| voltage | 8-13 V |
| energy consumption | 500 Wh |

At the end of the treatment, removed sodium chloride is of about 87% of total sodium chloride (i.e., a removed amount of 74 g over the fed amount of 85 g), with about 47 g of sodium hydroxide being produced in an aqueous solution at 11.7% by weight, and 33 g of hydrochloric acid being produced in an aqueous solution at 2.8% by weight. A solution, depleted of sodium chloride, is obtained, whose pH value is of 12.0, and whose COD value is of 14.0 g/liter, which solution has the following composition:

| | | |
|---|---|---|
| epichlorohydrin | <5 | ppm |
| isopropyl alcohol | 3.95 | g/liter |
| glycidol | 2.3 | g/liter |
| glycerol | 2.8 | g/liter |
| 3-chloro-1,2-propane-diol | 20 | ppm |
| 1,1-dichlorohydrin | 20 | ppm |
| 1,2-dichlorohydrin | 20 | ppm |
| sodium chloride | 10 | g/liter |

The anaerobic digestion is carried out in the same way as in above Example 1. In this case too, the acclimation of the bacterial flora to the synthetic substrate takes place within about 30 days. After this time, increasing amounts of the waste liquors having the hereinabove reported composition, at pH 7.0 and to which the nitrogen and phosphorus sources are added as shown under (C) of the above Example 1, are fed in mixture with the synthetic substrate (from 15% up to 100% over a time of about three months). The total organic load is maintained around about 5 kg of COD/m³ per each day.

Values of COD decrease higher than about 80% are reached after 70-80 operating days.

We claim:

1. A process for treating aqueous effluents from the production of epoxy resins, wherein the aqueous effluents comprise at least one chlorohydrin, glycidol, isopropyl alcohol and sodium chloride, wherein the process comprises:
   (a) hydrolytically treating the effluents under alkaline conditions so that epichlorohydrin is reduced from about 4100 ppm to about 75 ppm and glycidol is reduced from about 9600 ppm to about 4000 ppm;
   (b) removing about 90% of the sodium chloride from said hydrolyzed effluent;
   (c) diluting the concentration of epichlorohydrin, glycidol, and sodium chloride respectively, in said hydrolyzed effluent from step (b) followed by neutralizing said hydrolyzed effluent with sources of nitrogen and phosphorous, then anaerobically digesting said diluted neutralized hydrolyzed effluent.

2. The process of claim 1, wherein in step (a) sodium hydroxide is added to said treatment in the range of from about 5 to about 10 g/liter, at a pH in the range of from about 11 to about 13, at a temperature in the range of from about 50° C. to about 100° C., for about 1 to about 10 hours.

3. The process of claim 2, wherein said treatment of step (a) is conducted at a temperature in the range of from about 80° C. to about 90° C. for about 5 to about 6 hours.

4. The process of claim 1, wherein step (b) further comprises concentrating said hydrolyzed effluent at a pressure below atmospheric pressure.

5. The process of claim 1, wherein step (b) is conducted by means of electrodialysis.

6. The process of claim 1, step (c) wherein said digestion is conducted by contacting said diluted, neutralized, hydrolyzed effluent with an anerobic filter which has been prior inoculated with anaerobic flora and activated with a synthetic substrate.

7. The process of claim 1, step (a) wherein epichlorohydrin is reduced from about 4100 ppm to less than 10 ppm and glycidol is reduced from about 9600 ppm to less than 3,000 ppm.

* * * * *